(12) United States Patent
Rachie (10) Patent No.: US 7,752,104 B2
(45) Date of Patent: Jul. 6, 2010

(54) FINANCIAL INSTRUMENTS AND METHODS OF USE

(75) Inventor: David-Elias Rachie, Minneapolis, MN (US)

(73) Assignee: Bonaller LLC, Minneapolis, MN (US)

( * ) Notice: Subject to any disclaimer, the term of this patent is extended or adjusted under 35 U.S.C. 154(b) by 1291 days.

(21) Appl. No.: 10/963,984

(22) Filed: Oct. 12, 2004

(65) Prior Publication Data

US 2006/0080194 A1    Apr. 13, 2006

(51) Int. Cl.
*G06Q 40/00* (2006.01)
(52) U.S. Cl. ....................................... 705/35
(58) Field of Classification Search ............... 705/37, 705/35
See application file for complete search history.

(56) References Cited

U.S. PATENT DOCUMENTS

| | | |
|---|---|---|
| 4,885,685 A | 12/1989 | Wolfberg et al. |
| 5,200,889 A | 4/1993 | Mori |
| 5,233,514 A | 8/1993 | Ayyoubi et al. |
| 5,297,026 A | 3/1994 | Hoffman |
| 5,513,102 A | 4/1996 | Auriemma |
| 5,576,951 A | 11/1996 | Lockwood |
| 5,592,376 A | 1/1997 | Hodroff |
| 5,592,379 A | 1/1997 | Finfrock et al. |
| 5,642,419 A | 6/1997 | Rosen |
| 5,687,323 A | 11/1997 | Hodroff |
| 5,708,782 A | 1/1998 | Larson et al. |
| 5,734,838 A | 3/1998 | Robinson et al. |
| 5,794,207 A | 8/1998 | Walker et al. |
| 5,864,822 A | 1/1999 | Baker, III |
| 5,870,724 A | 2/1999 | Lawlor et al. |
| 6,058,371 A * | 5/2000 | Djian .......................... 705/14 |
| 6,460,021 B1 | 10/2002 | Kirksey |
| 6,584,450 B1 | 6/2003 | Hastings et al. |
| 6,684,207 B1 | 1/2004 | Greenfield et al. |
| 6,973,440 B1 * | 12/2005 | Gudio .......................... 705/37 |

OTHER PUBLICATIONS

Excursions Unlimited; "Travel Bonds for Motorcoach Tours"; Retrieved from http://www.exutors.com/main.htm.
Australian Taxation Ruling No. IT 2041; "Travel Bonds"; Jun. 2, 1983; http://www.austlii.edu.au/au/other/ato/itr/it2041.html.

* cited by examiner

*Primary Examiner*—James A Kramer
*Assistant Examiner*—Eric T Wong
(74) *Attorney, Agent, or Firm*—Ropes & Gray LLP (57) ABSTRACT

Financial instruments are disclosed. The financial instruments include one or more securities and one or more rights for investors to purchase credit. Methods and other applications are also disclosed.

8 Claims, 10 Drawing Sheets

FINANCIAL INSTRUMENTS AND METHODS OF USE

BACKGROUND

As their net worth grows, people often invest at least part of their financial portfolio in instruments that generate income. This income is often earmarked for traditional high retirement priorities, typically including housing, healthcare and travel. Because the objective is to produce a reliable stream of income, the preferred investments may include U.S. Treasuries, municipal bonds, and investment-grade corporate bonds. Of course, the safer the investment vehicle the lower the income stream it is likely to produce, which is why some investors elect to add stocks (especially reliable dividend paying stocks) or stock funds to their portfolios.

Some individuals choose to satisfy their leisure travel and other retirement needs by acquiring real estate, for example by purchasing a second home or by purchasing timeshare units. The purchase may be a real estate transaction that includes associated fees and transaction costs, including marketing. Property ownership also entails on-going real estate taxes, insurance and maintenance costs. Leisure property ownership—whether a direct purchase or via timeshare—is inherently high in overhead and provides assets that are inherently illiquid.

In the current economy, capital is often raised by issuing bonds or other securities that, in some cases, feature cash interest obligations and principal payment obligations. These securities are often used to provide the investment vehicles needed by investors, but they are often not flexible enough to provide optimal or maximal rates of return for an investor, particularly for investors who seek to use their investments for retirement travel and leisure. Improved investment vehicles are needed.

SUMMARY OF THE INVENTION

The invention relates to financial instruments and methods of use thereof. An exemplary financial instrument comprises a security provided by an issuer in exchange for a principal amount, and a first right granted to an investor to purchase credit. The security may be any type, such as a stock, preferred stock, a bond, warrant, mortgage, etc. The credit may be used to purchase goods or services, in certain embodiments at or below the market price for the goods or services. Additional rights to purchase credit may be issued to the investor in exchange for foregoing rights and/or canceling obligations (e.g., an obligation to re-pay at least a part of a principal amount). The instrument may be used to raise capital.

The principal amount, payment obligations (e.g., interest, dividend or other payments) or both may be backed by an additional instrument (e.g., a third party security). The principal, payment obligations, or both may also be backed by one or more other assets.

BRIEF DESCRIPTION OF THE DRAWINGS

The invention is described in more detail with reference to the accompanying figures, wherein like reference numerals designate identical or corresponding elements. The figures depict certain illustrative embodiments of the invention, which are to be understood as illustrative of the invention and not as limiting in any way.

DETAILED DESCRIPTION OF CERTAIN EMBODIMENTS

The invention relates to financial instruments and methods of use thereof. A financial instrument is issued by an issuer and obtained by an investor. The investor may obtain the instrument directly from the issuer or from a third party through a post-issuance transaction (e.g. a secondary market), or by any other transaction, etc.

The financial instrument typically comprises a security issued by the issuer, and a first right granted to the investor to purchase credit. In certain embodiments, a right to purchase additional credit may be provided to the investor. In certain embodiments, the security includes an obligation that an issuer pay an investor a principal amount, and an obligation that the issuer pay the investor one or more cash interest payments, according to a pre-determined interest rate, based on the principal amount. Other securities may be used.

The right to purchase credit may be established by a pre-determined schedule based on the face value of the credit. The credit may be used by the investor to purchase goods or services at or below the market price for the goods or services. The obligations and rights ascribed to the issuer and the investor are typically set forth in one or more contracts.

Figure 1:
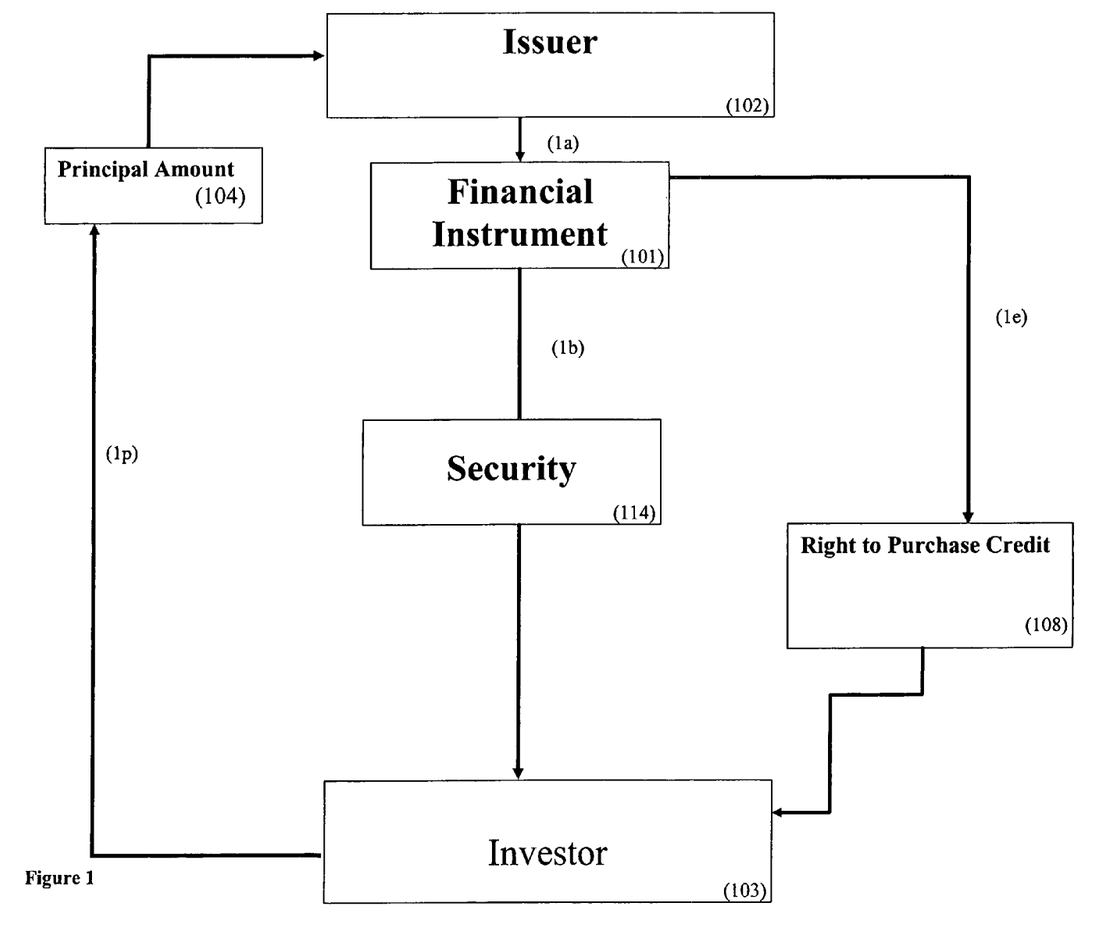
FIG. 1 depicts an embodiment of a financial relationship between an issuer and an investor in a financial instrument, where the financial instrument includes a security of any type provided in exchange for a principal amount.

The financial instruments may be further understood by reference to the figures. Specifically, FIG. 1 depicts an embodiment of a financial relationship regarding a financial instrument (101) between an issuer (102) and an investor (103) of a financial instrument. The financial instrument (103) is provided (1*a*) by the issuer (102) to the investor (103) and comprises a security (114) provided (1*b*) to the investor (103) and a first right (108) granted (1*e*) to the investor to purchase credit. The investor, in turn, provides (1*p*) a principal amount (104) to the issuer. Those skilled in the art recognize that the various embodiments and features described herein may be applicable, as desired, to this general relationship.

The principal amount is typically an amount provided by the investor in exchange for the financial instrument. For example, it may be an amount loaned by the investor, an amount paid by the investor for stock, or an amount otherwise provided (for example, for a warrant, mortgage, etc.). In certain embodiments, the principal amount is the basis of the investor's investment in the financial instrument. It may also function as the investor's basis in the underlying security.

Figure 2:
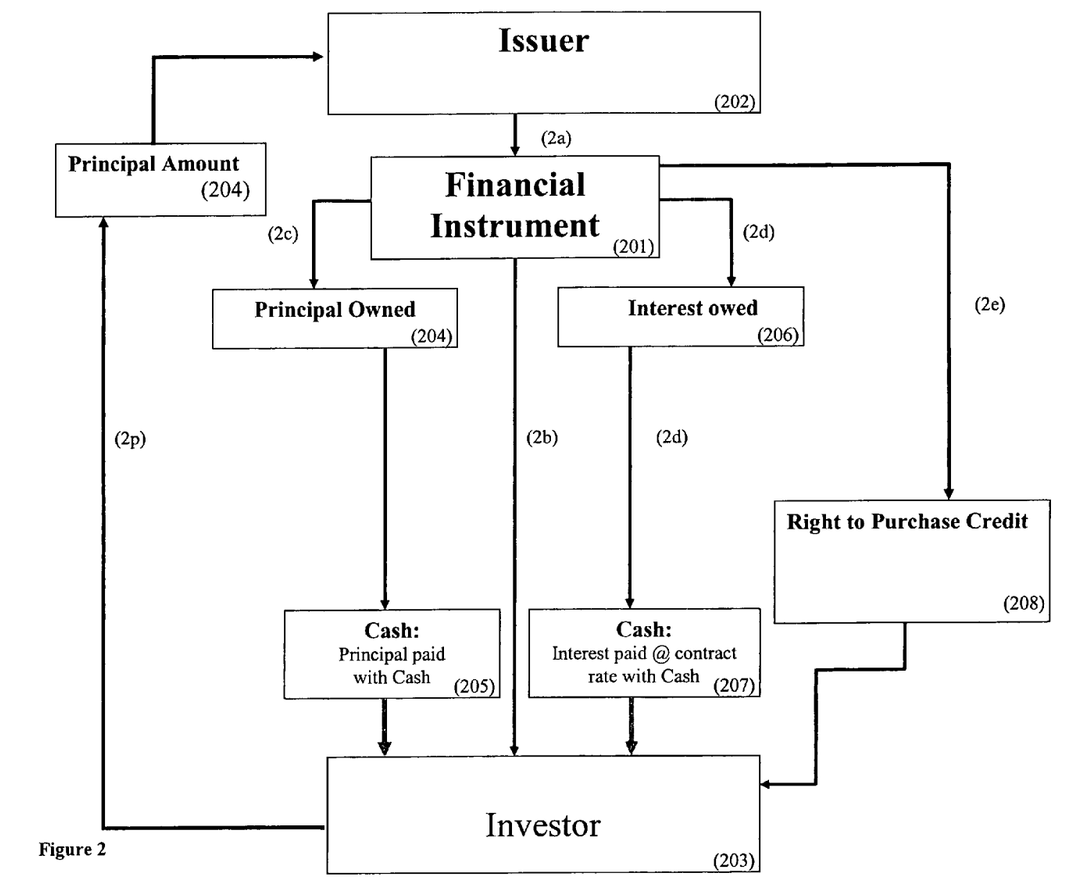
FIG. 2 depicts an embodiment of a financial relationship between an issuer and an investor in a financial instrument, where the instrument includes a security that is a debt obligation.

The financial instruments may include one or more of any security. The security may be stock, or a bond, a zero-coupon bond, a mortgage, a warrant, preferred stock, any other debt or equity based security, etc. For example, FIG. 2 depicts an embodiment of a financial relationship regarding a financial instrument (201) between an issuer (202) and an investor (203) in the financial instrument, where the security is a debt instrument, wherein the investor loans (2*p*) the issuer an amount (204) equal to the principal amount. In particular, the security comprises an obligation (2*c*) that the issuer pay the investor a principal amount (204) in cash (205), and an obligation (2*d*) that the issuer pay the investor one or more cash interest payments (206), according to an interest rate (207). The instrument also includes a first right (208) granted (2*e*) to the investor to purchase credit. As shown, the issuer issues (2*a*) the financial instrument, and the financial instrument is held (2*b*) by an investor.

In certain embodiments the security is stock. In certain embodiments, the security may include one or more of a bond, a mortgage, a warrant, preferred stock, or any other debt instrument. In certain embodiments the security is a STRIPS bond having no obligation to repay principal.

In certain embodiments the security is a bond provided by an issuer, the bond having no obligation that the issuer re-pay the principal amount. In certain embodiments the security is stock provided by an issuer, and the right to purchase credit is determined based on a number of shares of stock held by the investor. In certain embodiments the security is preferred stock provided by an issuer and may include an obligation that the issuer re-purchase at least a portion of the preferred stock after a period of time. In certain embodiments the security is a warrant with a right allowing the investor to purchase debt or stock.

In certain embodiments, the security is rated by one or more securities rating agencies, according to standard rating techniques known in the art. For example, where the security includes an obligation to pay principal and/or interest, the security may be rated by a rating agency based on the likelihood that the issuer will default on its obligations to pay the principal and interest owed to the investor according to the terms of the agreement between the issuer and the investor.

The issuer is typically a person or entity, or a plurality of one or both of the foregoing, that issues a financial instrument to an investor.

In certain embodiments, the instruments include one or more obligations which may include a promise or a covenant by one party to another (e.g., such as a promise by the issuer to pay an amount to an investor in the financial instrument). The principal amount is typically a specified dollar (or other currency) amount, in certain embodiments it is an amount loaned by the investor to the issuer.

The investor may be any person or entity but is not limited thereto. An investor may include without limitation any business, company, partnership, limited liability entity, corporation, or any other organization of any type, or any affiliated entity of any type. The investor may be a short-term (e.g., speculator) or long-term investor. The term is not intended to be limited in any way. In certain embodiments, one or more investors may hold an instrument. In certain embodiments, the instrument is offered to one or more public investors through a public-offering. The instrument may be offered along with a prospectus identifying potential risks and returns of purchasing the instrument, as well as a discussion of how the proceeds will be spent, and other information relevant to an investor.

The instrument may be transferable by the investor or the issuer to another person or entity; the instrument in certain embodiments is also defeasible. The investor and/or the issuer may also each designate a third party to receive payments, make payments, and otherwise exercise rights and/or fulfill obligations pertaining to the instruments.

In certain embodiments an interest rate is used and is typically a percentage. For example, where debt or other obligations are involved, the interest rate is typically a percentage. The interest rate may be determined upon or prior to the issuance of the financial instrument. In this respect it is predetermined. In certain embodiments the interest rate is identified after the issuance of the financial instrument. The interest rate may be fixed or variable. The interest payment obligation may be set forth in a schedule. Similarly, for embodiments involving stock, etc., where the issuer is obligated to pay dividends or to make other payments, the payment may be determined based on a rate that is identified prior to or after the issuance of the stock, etc. The payment rate may be fixed or variable. The payment obligation may be set forth in a schedule. In certain embodiments, dividends are declared by the issuer and paid per the declaration.

The interest, dividend, or other payments are typically made in cash. The payment obligation may require payment at a specified time or times. The payment may also be declared by the company. For example, the obligation may require the interest or dividend payment at the end of a specified time period, periodically during a specified time period, as declared by the issuer, etc. Similarly, the obligation to pay the principal amount may be applied at a specified time or times, for example at the end of a specified time period, periodically during a specified time period, during a period declared by issuer, etc. In certain embodiments a payment schedule is set forth upon or prior to the issuance of the financial instrument.

An interest payment owed to the investor may (but need not) be lower than the interest owed on a standard bond rated comparably to the security. Dividends may be declared less often (in certain embodiments dividends need not be declared) compared to dividends declared by other companies in the same industry as the issuer. In certain embodiments, the instrument allows the issuer to obtain needed cash (for example, cash for a financing project) while committing less cash to satisfy investor interest payment obligations than is required by comparably rated bonds. In other embodiments, the instrument allows the issuer to retain needed cash by not declaring a dividend, or by doing so less often, than other entities in the industry who are offering dividend payments. In certain embodiments, the issuer's stock price may be maintained despite such difference in dividend distribution.

In certain embodiments, there may be a debt security with no interest payment obligation at all. In certain embodiments the financial instrument may include an obligation to re-pay a principal amount and a right to purchase credit.

Figure 3:
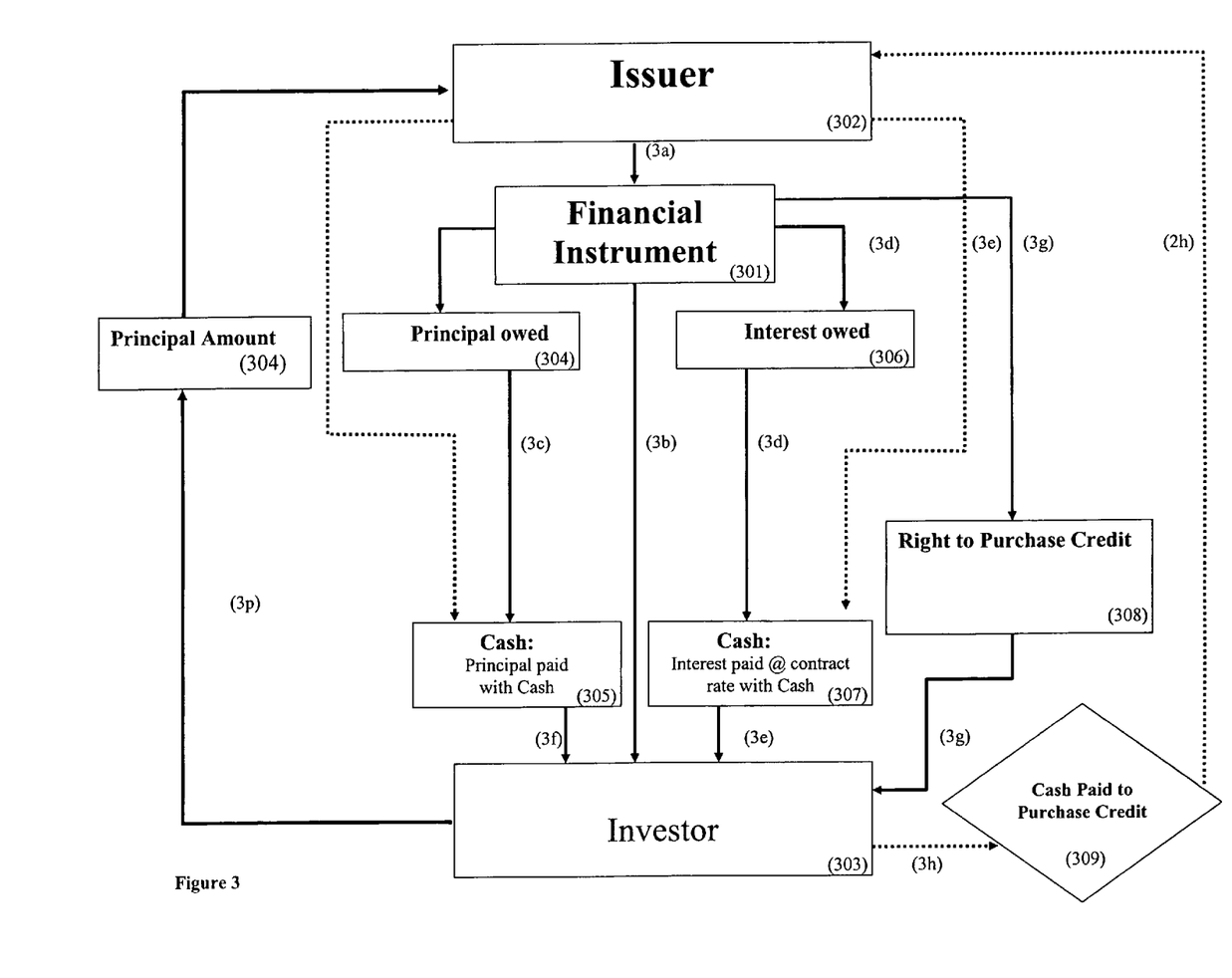
FIG. 3 depicts another embodiment of a financial relationship between an issuer and an investor in a financial instrument where the investor purchases credit and the issuer makes payment(s) in cash for interest and principal.

The investor also receives the right to purchase credit, which may be set forth according to a pre-determined schedule to the face value of the credit. In certain embodiments, the right to purchase credit is determined based on the investor's interest in the financial instrument. For example, the right to purchase credit may be determined based on the number of shares of stock held by the investor. In certain embodiments, the right to purchase credit is based on an amount of interest (or dividends) accrued to the investor, while in certain embodiments the right is set by a contract. FIG. 3 depicts handling of credit where the security is a debt instrument, depicting in particular a financial relationship regarding a financial instrument (301) between an issuer (302) and an investor (303) in the financial instrument, where the issuer issues (3a) the financial instrument, and the financial instrument is held (3b) by the investor. In this embodiment, the investor loans (3p) the issuer an amount (304) equal to the principal amount. The financial instrument comprises an obligation (3c) that the issuer re-pay the principal amount (304) in cash (305); an obligation (3d) that the issuer pay the investor one or more cash interest payments (306), according to an interest rate (307); and a first right (308) granted (3g) to the investor to purchase credit. The issuer may pay (3f) cash (305) to the investor for a principal amount (304) and may also pay (3e) cash (307) for interest owed (306) to the investor. As shown in the figure, the investor may exercise (3h) a right to purchase credit (309) by paying cash to the issuer.

The investor will typically use cash to purchase the credit, but in certain embodiments the purchase can be made by exchanging other credit. For example, the issuer may offer an investor an option to purchase credit by either paying cash or by exchanging credit of a different type (e.g., credit from an entity or person other than the issuer). In certain embodiments, for example where the security is stock, the investor may elect to use cash proceeds from the instrument (e.g., dividends received from stock) to purchase credit.

In preferred embodiments, the credit is cash-equivalent which may be measured in dollar (or other currency) amounts. For example, the cash-equivalent credit may include the right to purchase a specified dollar (or other currency) amount of goods or services. In certain embodiments, the credit having a dollar (or other currency) amount is usable in any approved venue; it may also be used to purchase multiple goods and services. For example, the credit may provide the investor the right to purchase a specified dollar value of lodging nights in a hotel. An example of credit obtained by the investor may include a $1000 credit for purchase of goods or services at approved venues.

Eligible goods and services may, but need not, be limited to a specified set of goods or services. For example, the credit may allow the purchase of a specified dollar (or other currency) amount of goods or services in certain product or service lines (e.g., lodging, dining, airfare, car rental). In certain embodiments the credit may be used to purchase items from a limited list, for example, room nights at a specific resort, but may not necessarily used to pay for items not specified on the list, such as a round of golf at a particular resort golf course. In certain embodiments, qualifying goods and/or services may include one or more of lodging, car rental, airfare, dining in a restaurant, golf and/or other sporting events, consumer goods, etc. Any other type of good or service may also be used. Certain vendors may allow an investor to use credit previously obtained by the investor to purchase any goods or services offered by the vendor. Examples include the purchase of consumer products from approved venues. Participating consumer product distributors may elect to allow substantially all goods and/or services they offer to be included as approved products.

The goods and services may be made available at one or more specified venues (e.g., a specified hotel). As used herein, the terms "venue" and "vendor" are used synonymously, and refer to any third party person or entity. In preferred embodiments, the credit having a dollar (or other currency) amount is usable in any approved venue. For example, an investor may have the right to purchase $1000 in credit which may then be used by the investor to purchase any combination of goods or services offered by one or more venues (e.g., $1000 to apply toward the purchase of any combination of lodging at a hotel chain, dining at a restaurant, car rental, air travel, etc.). Other currency denominations may also be used. The credit may be logged in an accounting system of the issuer, an accounting system of the investor or both, under a denomination in any currency (e.g., United States dollars). The investor may also use credits issued in one denomination (e.g., United States dollars) to purchase goods and services in another denomination (e.g., Euro dollars). In such embodiments the accounting system of the issuer may automatically provide the exchange according to a currency exchange schedule.

The credit has market value which is equal to its face value. For example, a credit for $1000 has a market value of $1000 because it can be used for the purchase of $1000 in goods and services. In preferred embodiments, the credit (e.g., cash-equivalent credit) may be purchased by the investor at a price that is a percentage of the market value of the credit. For example, an investor may be offered the right to purchase a specified dollar (or other currency denominated) amount of credit at a price that is a percentage of the specified dollar (or other currency denominated) amount. In preferred embodiments, the percentage is greater than 0% but less than 100%. The credit may then be used to purchase goods and services from approved venues at retail or other prices. In certain embodiments, the investor is offered a guarantee that the prices of the goods and services offered by the approved venues will be the lowest prices available to cash or even preferred customers of the venue.

In preferred embodiments, the credit may be used at any time after it vests. In certain embodiments, the credit vests when it is purchased. In certain embodiments the credit may vest before it is purchased. The investor may purchase goods and services in exchange for credit, and pay for the credit after the purchase. For example, the investor may purchase a good or service from a vendor by use of a credit card from the issuer.

In certain embodiments, the price paid by the investor is less than the purchase price of the goods and services purchased. In certain embodiments the vendor may bill the issuer for the full purchase price or, in certain embodiments, for an amount less than the purchase price. Thus, the investor may purchase the goods and services at a discount, and the vendor, the issuer or both may absorb the cost to provide the discount. In certain embodiments the credit usage may be limited to one or more pre-appointed periods of time, or to pre-determined goods or services, as determined by the issuer or a third party. The credits may also be assigned or otherwise conveyed from the investor to a third party.

Credit, in certain embodiments, may be purchased to pay for qualifying goods or services purchased at approved venues using credit (such as through a credit card). Typically, the credit can be used by the purchaser at one or more venues approved by the issuer. The venues may include any businesses or other providers of goods or services. For example, an approved venue may include one or more retail chains, hotels, restaurants, rental car agencies, airlines, etc. In certain embodiments, an approved venue may be one or more venues in which the issuer has made a financial investment. For example, the issuer may offer a loan (or other investment) to one or more venues in exchange, at least in part, for credit to purchase goods or services from the venue or venues; the issuer then may offer investors the right to purchase the credit due to the issuer from the venue or venues. The venues, the qualified goods and services, or both may also change over the life of the financial instrument.

Figure 4:
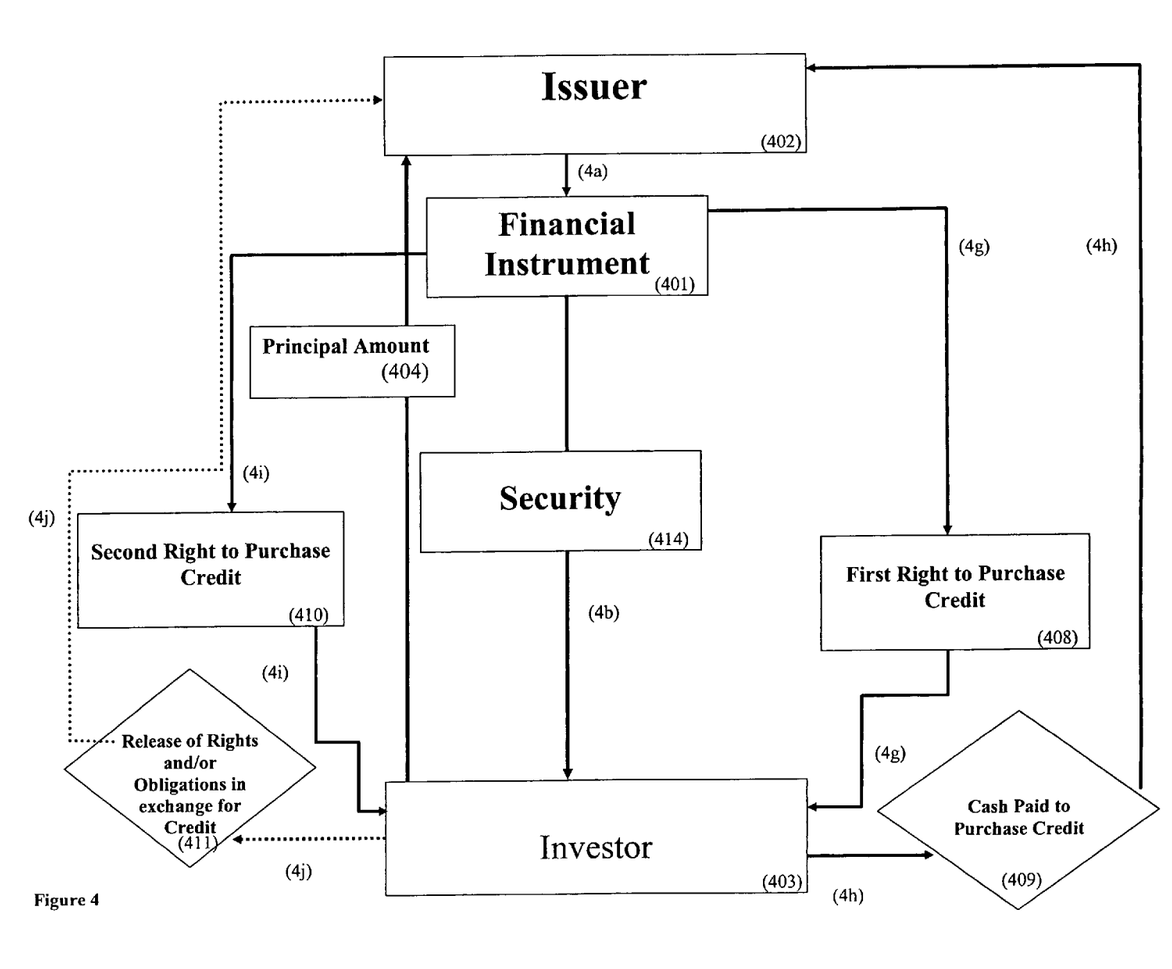
FIG. 4 depicts an embodiment of a financial relationship between an issuer and an investor in a financial instrument, where the financial instrument includes one or more additional rights to purchase credit in exchange for release of rights and/or obligations.

In certain embodiments the financial instrument includes additional rights for the investor to purchase credit. For example, FIG. 4 depicts an embodiment of a financial relationship where an issuer (402) provides (4a) a financial instrument (401) to an investor (403) and the investor conveys some or all of the principal amount (404) to the issuer. The financial instrument comprises a security (414) and a first right (408) granted (4g) to the investor to purchase credit (the investor may exercise (4h) a right to purchase credit (409) by paying cash). The financial instrument may also include a second right (410) granted (4i) to the investor to purchase credit, and the investor may exercise (4j) such second right by foregoing certain rights and/or releasing the issuer from performing certain obligations (411).

Figure 5:
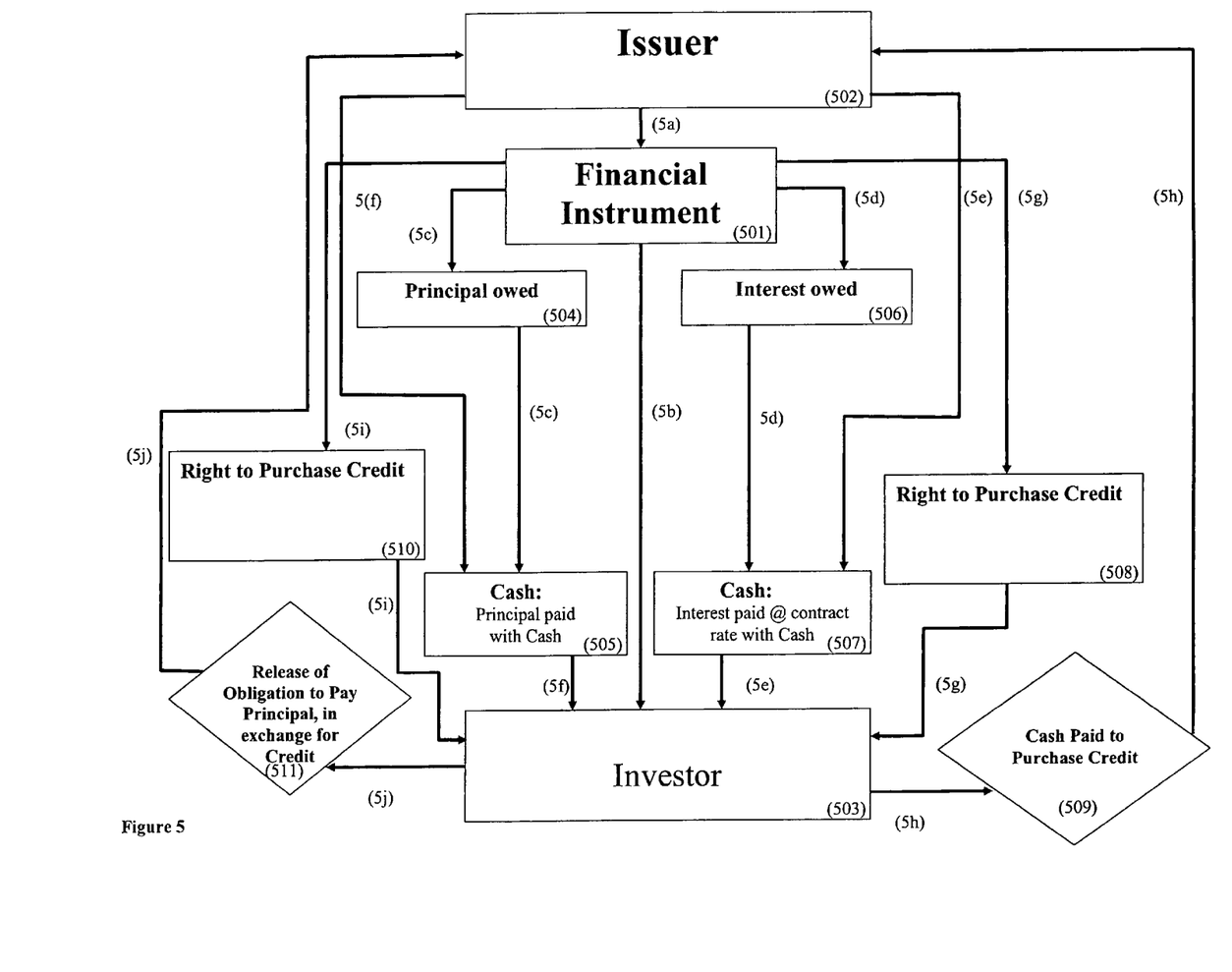
FIG. 5 depicts another embodiment of a financial relationship between an issuer and an investor in a financial instrument where the investor exercises the right to obtain credit in exchange for releasing the issuer from an obligation to pay principal.

The release (411) of rights and/or obligations may be adapted depending on the type of security issued. For example, the investor may elect to release the issuer from performing one or more obligations, including obligation to pay part or all of a principal amount owed, in exchange for the right to purchase credit. In certain embodiments the purchase of such credit is in addition to a first right to purchase credit granted to the investor. FIG. 5 exemplifies this possibility, depicting an embodiment of a financial relationship regarding a financial instrument (501) between an issuer (502) and an investor (503), where the issuer issues (5a) the financial instrument, and the financial instrument is held (5b) by the investor. The financial instrument comprises an obligation (5c) that the issuer pay the investor a principal amount (504) in cash (505); an obligation (5d) that the issuer pay the investor one or more cash interest payments (506), according to an interest rate (507); and a first right (508) granted (5g) to the investor to purchase credit. The issuer pays (5f) cash (505) to the investor for a principal amount (504) and pays (5e) cash (507) for interest owed (506) to the investor. The investor may exercise (5h) a right to purchase credit (509) by paying cash. The issuer may also provide (5i) the investor a second right (510) to purchase credit, and the investor may exercise (5j) such second right by releasing (511) the issuer from an obligation to pay principal.

Other examples are available, such as embodiments where the security is stock or preferred stock. The investor may elect to forego the receipt of dividends from stock to obtain the right to purchase credit. In certain embodiments the investor may elect to forego the right to purchase the debt and/or stock in exchange for a right to purchase additional credit. In other examples, preferred stock may include a right to purchase stock (e.g., common stock) under specified terms, and it may also include an obligation that the issuer re-purchase at least a portion of the preferred stock after a period of time. The investor may elect to forego the right to purchase the common stock, or release the issuer from the obligation to repurchase the stock, or both, in exchange for a right to purchase additional credit. In other examples, the security is a warrant with a right that allows the investor to purchase debt or stock. Thus, one or more additional rights to purchase credit may be granted to the investor.

In certain embodiments the additional credit has one or more features in common with other credit purchased. For example, the credit may be cash-equivalent, it may be used to purchase at least one qualifying good or service (such as from a venue approved by the issuer), etc.

Figure 6:
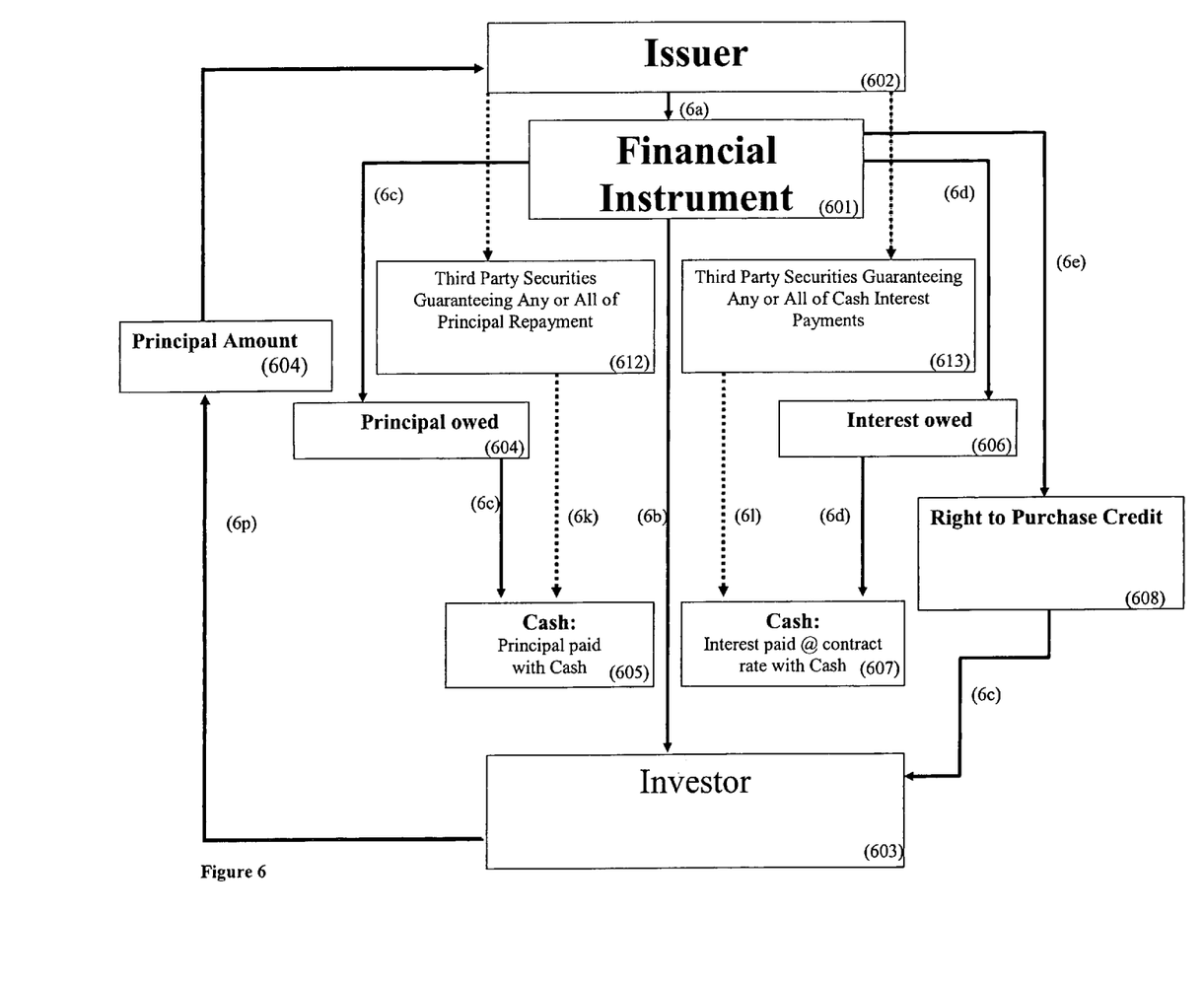
FIG. 6 depicts another embodiment of a financial relationship between an issuer and an investor in a financial instrument where interest and/or principal payment obligations are backed by third party securities.

In certain embodiments, one or more of the issuer's obligations are backed by one or more funding sources, which means that the one or more funding sources are available if needed to assist the issuer in fulfilling the obligations (or even guaranteeing the fulfillment thereof). For example, the issuer may have a source of income other than the principal amount of a loan, and such additional source may pay interest, dividends, or other income to the issuer. The issuer may use (or make available for use if needed) such interest, dividends, or other income to fulfill its obligations to the investor (e.g., to pay dividends, interest, principal, etc. to the investor). The issuer may also obtain an insurance policy or other financial obligation of a third party to cover shortfalls in the issuer's ability to meet its obligations.

Where applicable, the issuer's payment obligations (e.g., dividends, principal, interest, any combination of the foregoing, etc.) may be backed by one or more third party securities. For example, FIG. 6 depicts a financial relationship between an issuer (602) and an investor (603) of a financial instrument (601), where the issuer issues (6a) the financial instrument, and the financial instrument is held (6b) by the investor. The financial instrument comprises an obligation (6c) that the issuer pay the investor a principal amount (604) in cash (605); an obligation (6d) that the issuer pay the investor one or more cash interest payments (606), according to an interest rate (607); and a first right (608) granted (6e) to the investor to purchase credit. In this embodiment, the investor loans (6p) the issuer an amount (604) equal to the principal amount. One or more third party securities (612 and 613) may also be used to back the principal (606) and interest payment(s) (606) owed to the investor. The one or more third party securities are obtained by the issuer, for example, by use of the principal amount obtained from the financial instrument offering. In FIG. 6, the third party securities are used to back (6k) the obligation to pay principal, as well as to back (61) the obligation to pay interest.

In certain embodiments, the third party is a government agency, and a suitable third-party security may be a government-backed security, such as a treasury bill or other note, but any security could be used. A third-party backed security typically includes a promise (or even a guarantee) that a party will receive an interest payment (or other required payment) from the third party according to a pre-determined interest rate. For example, a government-backed security may promise that a party will receive an interest payment that is guaranteed by the U.S. Treasury. Where the issuer of a financial instrument also obtains a third-party backed security, any interest payment or other payment, or portion thereof, received by the issuer from the third-party may be used to pay at least a portion of the cash interest obligation (or the principal amount, or dividend, or other payment owed, if desired) owed to the investor in the financial instrument. In certain embodiments, a suitable third-party-backed security may include one or more United States Treasury obligations (T-Bills, notes, bonds, etc.) or other notes; it may also include an investment grade debt instrument or a below-investment grade debt instrument. In certain embodiments, the third-party backed security is backed by the full faith and credit of the issuing government authority (e.g., by the United States Treasury). In certain embodiments, a third-party backed security may be issued by a public or private company or other entity.

The third-party backed security may also be later divested and the proceeds used to re-pay all or a portion of the loan amount or interest owed to the investor. In certain embodiments, a third-party backed security may be purchased by the issuer using a portion (or all) of the proceeds from the offering of a financial instrument. In certain embodiments, no third party security or other funding sources are used to back the principal or interest payment obligations.

The funding sources may also include assets (e.g., an asset purchased through the use of the principal amount, assets associated therewith, etc.). Backing assets may include, for example, real property, intellectual property, capital equipment, or other assets, all or part of which may be later sold to fulfill all or part of the issuer's obligations (e.g., to pay all or a portion of the principal amount or outstanding interest, dividends or other amounts owed to the investor). The issuer may also elect to simply hold a backing asset in escrow in case it is needed to fulfill obligations (e.g., to pay interest, principal, dividends, etc.). Similarly, any revenue or other payments received by the issuer from such backing assets may also be used to back the interest, principal, dividends or other amounts owed to the investor. In certain embodiments, the issuer may offer the investor a security interest in an asset (e.g., in a hotel property), or in one or more associated assets (e.g., hotel furniture, restaurant equipment, vehicles of an auto-rental establishment, etc.).

The financial instruments provide an overall rate of return to the investor, which is derived from the combination of the cash interest, dividends, or other amounts received by the investor and from the right to purchase credit. The investor's overall rate of return is calculated as follows:

$$ROI = \frac{X + Y - Z}{PA}$$

Wherein:
'X' represents an amount of cash interest, dividends, or other owed to the investor,
'Y' represents a market value of the credit,
'Z' represents a price the investor must pay to purchase the credit, and
'PA' represents a principal amount.

Typically, the overall rate of return offered to the investor is established by market forces prior to issuance of the financial instrument, often according to standard pricing mechanisms well known in the art. In certain embodiments, the issuer and an underwriter negotiate prior to issuance for the overall rate of return of the instrument and/or the security and the cash interest rate to be included with the offering of the instrument.

Typically, the instruments provide an investor with a rate of return that is more favorable than other rates of return available in the market place. In certain embodiments, the overall rate of return on the instrument may exceed the average rate of return offered by other comparable securities in the market. For example, an instrument may be offered with a debt security (e.g., an investment grade rated bond) and provide an overall rate of return that exceeds the average rate of return offered by other investment-grade rated bonds. The system for rating debt is well known in the art. For example, investment-grade rated bonds known in the art include bonds rated at least BBB or its equivalent by a securities rating agency. An instrument offered with an equity security (e.g., common stock) may provide an overall rate of return that exceeds the average rate of return offered by other companies in the same industry. In certain embodiments the return exceeds the return offered by companies having similar price/earning ratios, similar risk profile, etc. In certain embodiments, the overall rate of return offered to the investor is at least about 10% (or even 50% or 100% or more) greater than the average rates of return offered by a comparable security (e.g., by investment-grade rated bonds, stock of other companies in the same industry, etc.).

The financial instruments may also offer higher rates of return than those offered by a time-share or other property-based investment. A time share investment typically does not offer cash payments to the investor during the ownership term, and an investor's primary return on investment arises as a capital gain when the investor divests its ownership interest, which is subject to the volatility and declination of the re-sale market for time-shares. Additionally, these types of investments commonly require regular infusions of capital to maintain their value and marketability.

As noted above, the credit (e.g., cash-equivalent credit) is offered to the investor for purchase at a price that is a percentage of the market value of the credit. Where the percentage is less than 100%, the investor obtains an increased rate of return on its investment in the financial instrument. The investor's rate of return on the instrument increases as the percentage decreases.

The investment vehicles and methods may provide favorable returns on investment for the issuer. The issuer may elect to invest the proceeds from the offering in any number ways. For example, the issuer may use some of the proceeds for purchasing the asset and retain a portion of the proceeds for its investors or for future business expenses. In certain embodiments, the investment vehicles and methods assist in providing economic gains to issuers and investors in investment vehicles. For example, a retailer may borrow money to open a new store directly from its customers in exchange for store credit. Because the retailer is exchanging the right to buy products in his store for what would otherwise be a cost of doing business (a cash interest expense), the retailer can offer an overall rate of return to the investor that is higher than offered by comparably rated securities, and still retain some of the cost of doing business. As noted above numerous applications could be made, including with the rental car industry, airlines and entertainment venues, and many others. In certain embodiments, the instruments and methods assist in eliminating some of the inefficiencies in the lodging and capital markets. For example, savings could be realized in the form of discounted lodging for travelers and discounted cost of capital for the lodge owner.

Other variations on the structure of the financial instrument are possible. For example, a second credit may be offered by the issuer to the investor in exchange for canceling an obligation to repay at least a part of the principal amount. The investor may optionally have the right to purchase credit using principal.

Methods incorporating or using a financial instrument according to the invention may also be adapted. For example, a method for raising capital may use one of the financial instruments as a vehicle.

In certain embodiments, the invention contemplates a method for raising capital for the purchase of an asset, comprising issuing a debt security, wherein the debt security comprises (i) an obligation that an issuer pay an investor a principal amount, and (ii) an obligation that the issuer pay the investor one or more cash interest payments, according to a pre-determined interest rate, based on the principal amount; and granting a right to an investor to purchase credit. The obligation to pay principal may also be accompanied by a payment schedule. In certain embodiments the right to purchase credit is made according to a pre-determined schedule based on the face value of the credit or on the accrued interest, for example an investor may be offered an opportunity to obtain credit in exchange for cash interest owed to the investor.

In certain embodiments, a method for raising capital is contemplated, comprising issuing a debt security, wherein the debt security comprises (i) an obligation that an issuer pay an investor a first principal amount; (ii) an obligation that the issuer pay the investor one or more cash interest payments, according to a pre-determined interest rate, based on the first principal amount; and (iii) a first right granted to the investor to purchase credit. The method may also include using a portion of the first principal amount to purchase a security that is backed by a third party, wherein the third party security comprises a loan or other security provided by the issuer to the third party of a second principal amount, the third party security being accompanied by a second cash interest payment obligation by the third party to the issuer, and using at least part of the second cash interest payment received from the third party to satisfy at least part of the first cash interest payment owed to the investor. At least part of the second principal repayment from the third party may also be used to satisfy part or all of the first principal repayment (or the interest payment obligations) owed to the investor.

Figure 7:
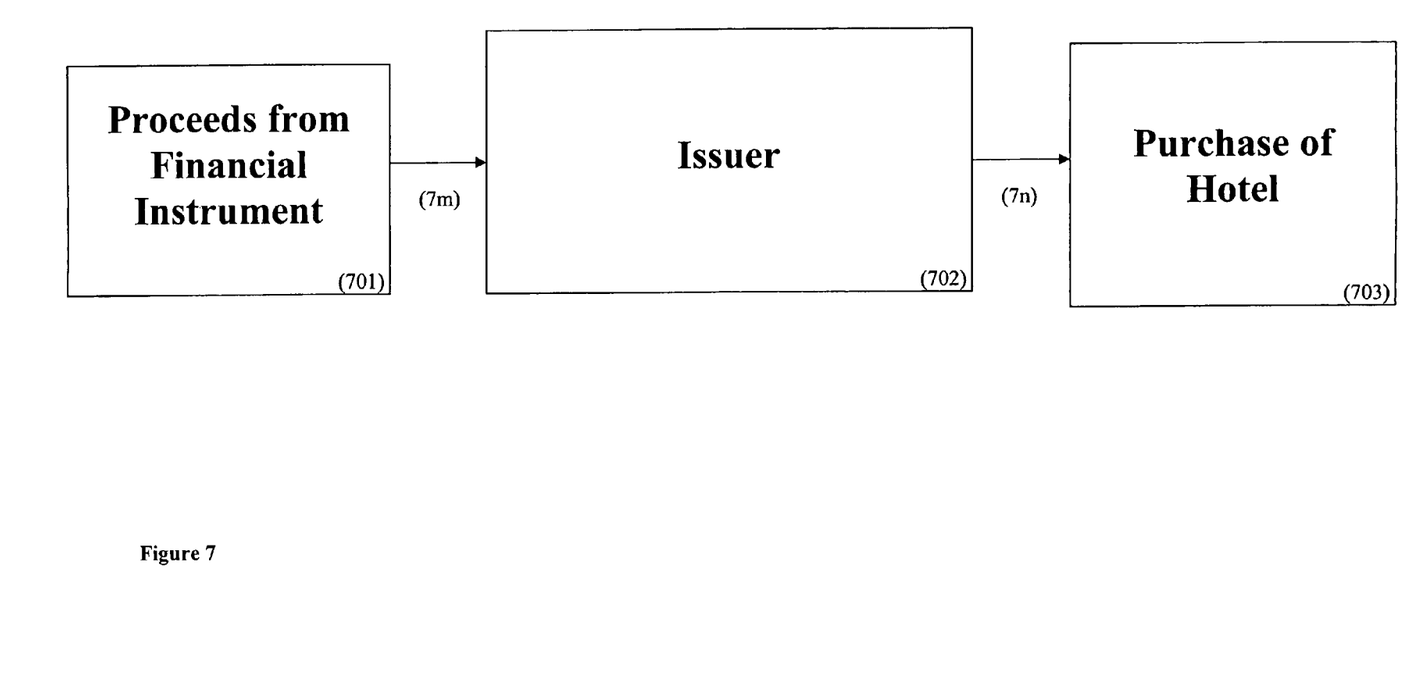
FIG. 7 depicts an issuer's use of a portion of the proceeds from a financial instrument offering to purchase an asset.

The principal amount may be used by the issuer for any investment purpose. FIG. 7 depicts an issuer (702) obtaining (7m) proceeds from a financial instrument offering (701) and using the proceeds to purchase (7n) a hotel (703). In certain embodiments, the principal amount may be used to purchase assets that include, for example, real estate (e.g., hotel), other commercial property (e.g., rental cars or airplanes), an operating business (e.g., automobile rental agency) or expansion of an existing business, intellectual property (e.g., a trademark or patent), or other assets. The principal amount may also be used to purchase credit from other entities or persons, or for any other purpose.

In certain embodiments, where the issuer uses the principal amount to purchase an asset, the investor may be offered the right to use the purchased credits to purchase goods and services from venues associated with the purchased asset. For example, where a hotel is purchased, the venues for purchase of goods and services may include one or more of the hotel, a restaurant, a casino, a golf course, a rental car agency, an airline, etc., all of which may be associated with the hotel through common ownership, joint venture, partnership, affiliation, or any other formal or informal relationship.

In certain embodiments, the invention or certain aspects thereof may be implemented through a computer. For example, the invention may be implemented through an electronic management and accounting system. The invention may be implemented in hardware circuitry, in computer software, or a combination of hardware circuitry and computer software and is not limited to a particular hardware or software implementation.

Figure 8:
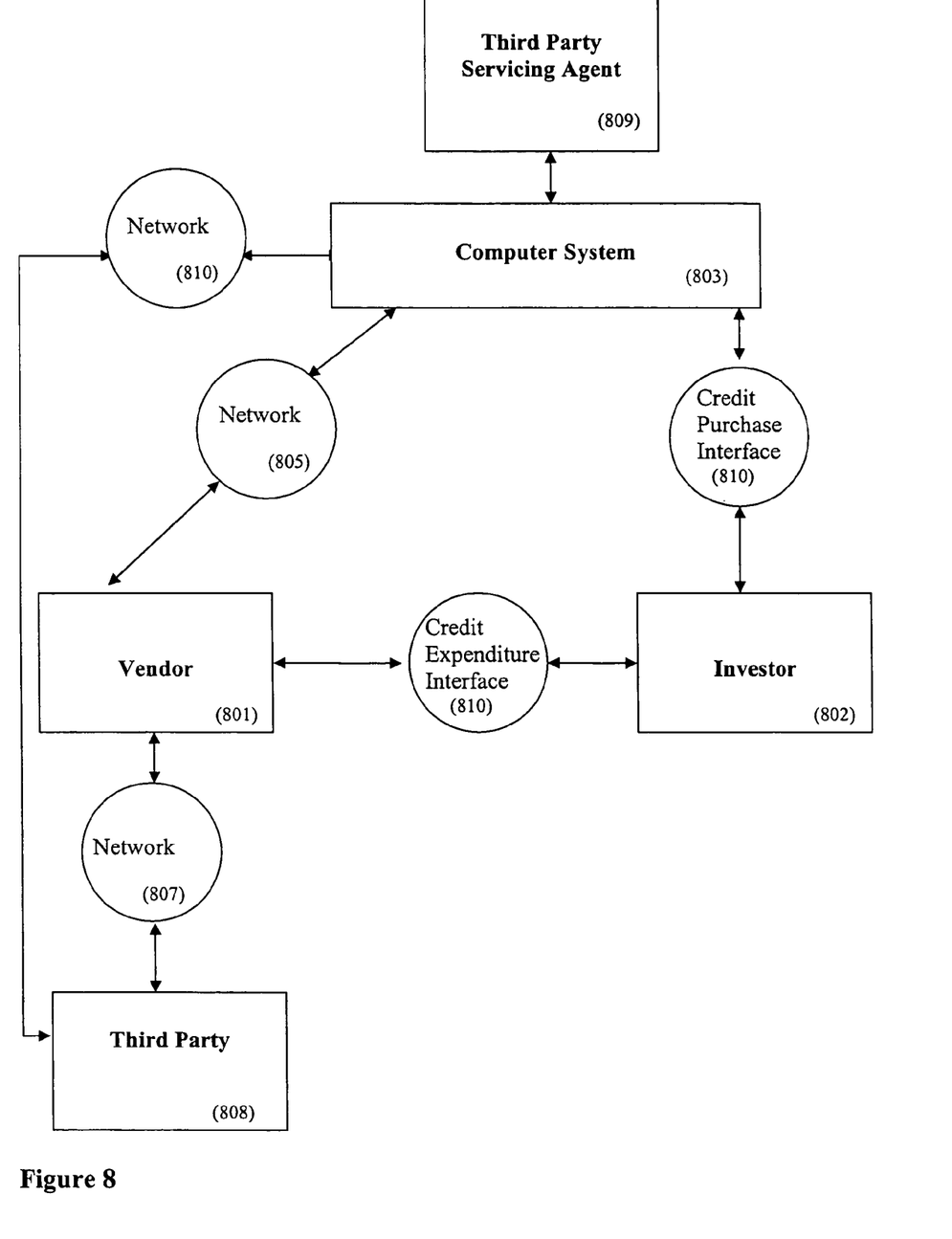
FIG. 8 depicts an exemplary computer-based communication scheme between one or more participating vendors and an investor to track the use of credit obtained from a financial instrument.

FIG. 8 depicts an exemplary computer-based communication scheme between one or more participating vendors (801) and an investor (802) to track the use of credit purchased according to a financial instrument, as described herein. A computer system (803) will typically be used to determine and track various information about the financial instrument, used to calculate the amount of credit purchased by the investor and the amount of credit used, and used to communicate to participating vendors the amount of credit the investor has purchased.

An investor may purchase credit through a credit purchase interface (804) that communicates to the computer system (803) how much credit is purchased. The credit purchase interface may be implemented through a variety of forms, including for example electronic on-line purchase (e.g., use of Internet to transfer funds from one account to the relevant credit account), wire transfer, or even purchase by cash or check. The computer system (803) may communicate to the vendors (801) the level of credit available to an investor (802) through an electronic network (805). Similarly, the vendors may communicate through the network the amount of credit expended by an investor. The investor (801) may transact its purchase of goods and/or services through a credit expenditure interface (806). The credit expenditure interface may be implemented through a variety of forms, including for example electronic on-line means (e.g., use of Internet to transfer funds from one account to the relevant credit account), credit card scanning, or even use of hard copy forms of credit expenditure.

The vendor may also elect to use a third party (808) to confirm the level of credit available to a purchaser before accepting a transaction for a particular good or service. The third party will preferably have access to the computer system (803) (and, therefore, to the investor's available credit) through a network (809). In certain embodiments the invention is implemented in an accounting system of the issuer. The system may be electronic or hand-written, and it may include an interface with one or more accounting systems operated by a vendor, investor, or others.

Figure 9:
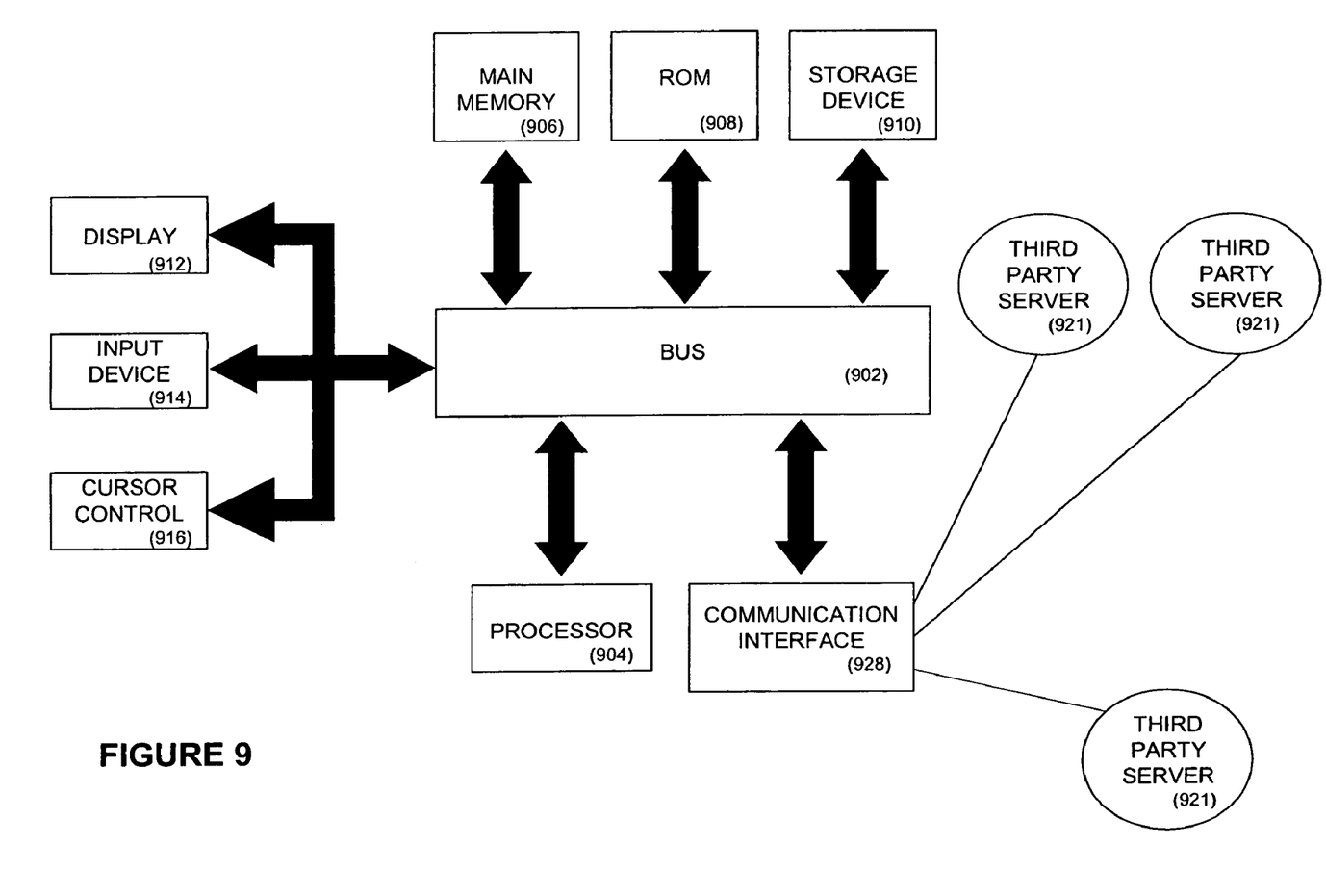
FIG. 9 depicts a computer system upon which an embodiment of the invention may be implemented.

FIG. 9 is a block diagram that illustrates a computer system (900) upon which an embodiment of the invention may be implemented. Computer system (900) includes a bus (902) or other communication mechanism for communicating information, and a processor (904) coupled with bus (902) for processing information. Computer system (900) also includes a main memory (906), such as a random access memory (RAM) or other dynamic storage device, coupled to bus (902) for storing information and instructions to be executed by processor (904). Main memory (906) also may be used for storing temporary variables or other intermediate information during execution of instructions to be executed by processor (904). Computer system (900) further includes a read only memory (ROM) (908) or other static storage device coupled to bus (902) for storing static information and instructions for processor (904). A storage device (910), such as a magnetic disk or optical disk, is provided and coupled to bus (902) for storing information and instructions.

Computer system (900) may be coupled via bus (902) to a display (912), such as a cathode ray tube (CRT), for displaying information to a computer user. An input device (914), including alphanumeric and other keys, is coupled to bus (902) for communicating information and command selections to processor (904). Another type of user input device is cursor control (916), such as a mouse, a trackball, or cursor direction keys for communicating direction information and command selections to processor (904) and for controlling cursor movement on display (912). This input device typically has two degrees of freedom in two axes, a first axis (e.g., x) and a second axis (e.g., y), that allows the device to specify positions in a plane.

The invention provides computer implemented methods for providing and managing credit for investors in financial instruments. According to one embodiment, the providing and/or managing of credit to investors in financial instruments is provided by computer system (900) in response to processor (904) calculating an amount of credit available to an investor based on the amount of such credit purchased by the investor, and issuing one or more instructions (e.g., to credit the investor's account in a database accessible by one or more participating vendors) contained in main memory (906). Such instructions may be read into main memory (906)

from another computer-readable medium, such as storage device (910). Calculating the credit available and issuing instructions contained in main memory (906) causes processor (904) to perform communicative steps with one or more vendors and/or with the investor. One or more processors in a multi-processing arrangement may also be employed to perform the communicative steps. Software may be implemented with the computer system. In alternative embodiments, hard-wired circuitry may be used in place of or in combination with software to implement the methods described herein. Thus, embodiments of the invention are not limited to any specific combination of hardware circuitry and software.

The term "computer-readable medium" as used herein refers to any medium that participates in providing instructions to processor (904) for execution. Such a medium may take many forms, including but not limited to, non-volatile media, volatile media, and transmission media. Non-volatile media includes, for example, optical or magnetic disks, such as storage device (910). Volatile media includes dynamic memory, such as main memory (906). Transmission media includes coaxial cables, copper wire and fiber optics, including the wires that comprise bus (902). Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in providing instructions to processor (904) for execution. For example, the instructions (e.g., to calculate a present balance of credit available to an investor in a financial instrument) may initially be carried on a magnetic disk of a remote computer. The remote computer can load the instructions into its dynamic memory and send the instructions over a telephone line using a modem. A modem local to computer system (900) can receive the data on the telephone line and use an infrared transmitter to convert the data to an infrared signal. An infrared detector coupled to bus (902) can receive the data carried in the infrared signal and place the data on bus (902). Bus (902) carries the data to main memory (906), from which processor (904) retrieves and executes the instructions. The instructions received by main memory (906) may optionally be stored on storage device (910) either before or after execution by processor (904).

Computer system (900) also includes a communication interface (918) coupled to bus (902). Communication interface (918) provides a two-way data communication coupling to a network link (920) that is connected to one or more third party computer systems. For example, communication interface (918) may be an integrated services digital network (ISDN) card or a modem to provide a data communication connection to a corresponding type of telephone line which line may, in turn, be in communication with a network of a participating vendor. As another example, communication interface 918 may be a local area network (LAN) card to provide a data communication connection to a compatible LAN. Wireless links may also be implemented. In any such implementation, communication interface (918) sends and receives electrical, electromagnetic or optical signals that carry digital data streams representing various types of information.

Network link (920) typically provides data communication through one or more networks to other data devices. For example, network link (920) may provide a connection to one or more third party computer systems (924). Such connection may also occur through the Internet.

Computer system (900) can send messages and receive data, including program code, through the network(s), network link (920) and communication interface (918). Similar computer systems may be used by vendors, issuers, investors, and/or other parties (e.g., servicing agents, credit agencies) to coordinate the provision and management of the investor's credit.

In certain embodiments, a server might transmit a requested code for an application program through the Internet, ISP, local network, or other communication interface. One such downloaded application provides information regarding the credit available in an investor's account. The received code may be executed by processor (904) as it is received, and/or stored in storage device (910), or other non-volatile storage for later execution. In this manner, computer system (900) may obtain application code in the form of a carrier wave. Exemplary computer implementation systems have been used in other fields and may be adopted for use with the disclosed instruments and methods. See, for example U.S. Pat. No. 6,584,450.

Figure 10:
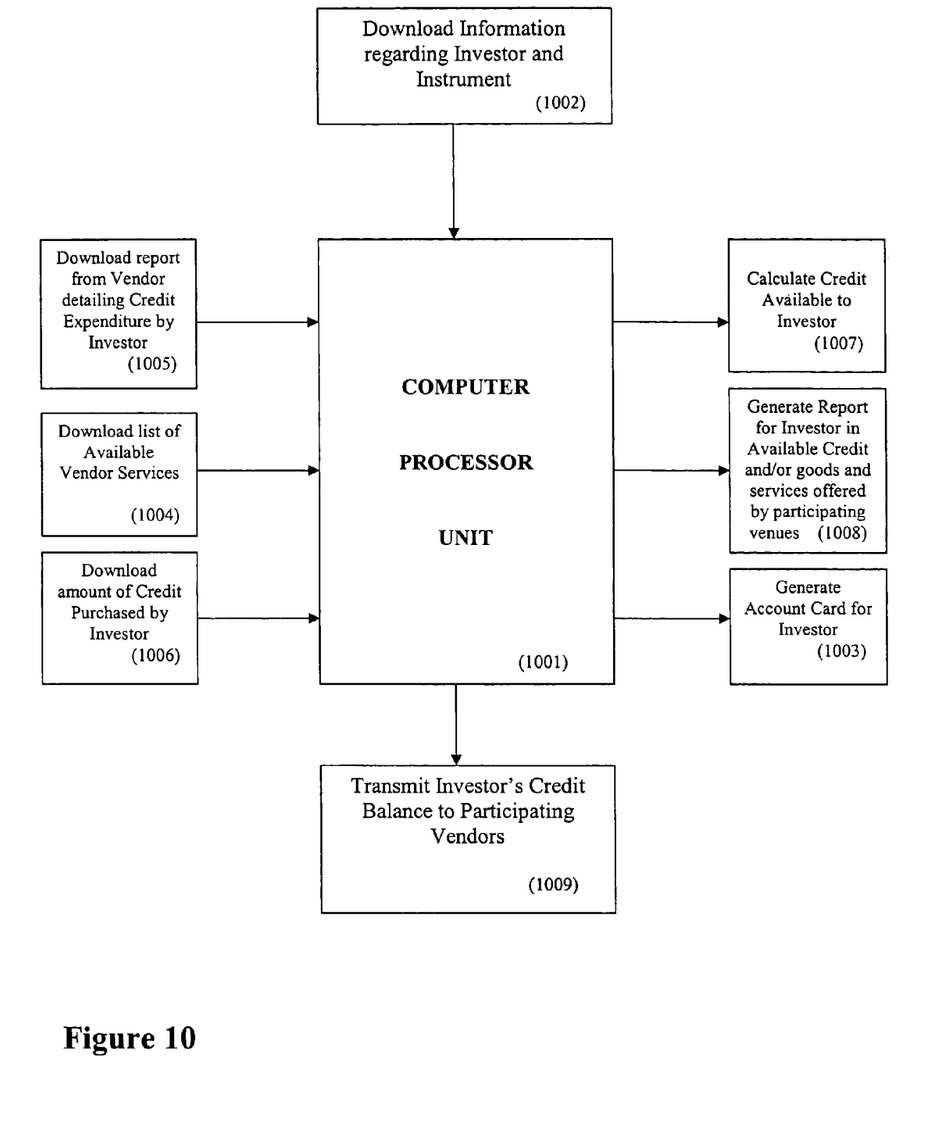
FIG. 10 depicts a computer-based process for the issuance and tracking of credit made available to and/or purchased by an investor in a financial instrument.

FIG. 10 is a computer-based process for the issuance and tracking of credit made available to and/or purchased by an investor in a financial instrument. A computer processor unit (1001) receives information (1002) about a financial instrument, the investor thereof, and/or any other information desired. For example, basic information about the investor may include the investor's name, address, phone and other contact information, type of instrument(s) purchased by the investor (including applicable CUSPID numbers), as well as information pertaining to the investor's right to purchase credit, the value of goods and services available, the price of credit, expiration date of the rights, balance of credit available, etc.

The information may also include, for example, information related to financial instruments issued to one or more investors, such as the type of instruments, the associated CUSPIDs, the quantities of the instruments issued to applicable investors, the face values of the issued instruments, issue dates, terms, interest rates, dividend rates, payment schedules, etc. Any other desired information could be supplied, such as the amount of interest and principal owed. Information regarding each investor's right to purchase credit may also be provided, such as the amount of credit, relevant vesting schedules, ratio of credit to value of credit, the price of available credit, expiration and other relevant dates, etc. Vendor information may also be supplied, such as a list of participating vendors and available goods and services, or even a description of processes for identifying qualified goods, services, vendors, etc. Currency conversion information may also be supplied, such as the rates converting one denomination of currency to another and conversion rates as compared to other instruments issued to one or more investors.

The computer processor unit (1001) functions as a communication medium for providing and/or managing the credit available to an investor in the instrument. In certain embodiments the unit (1001) may generate an account card (1003) for the investor (such as a card that is electronically linked to the investor's credit account), thereby allowing the investor to use the card to purchase goods or services at participating venues. The computer processor unit (1001) may also receive updated information from one or more participating vendors pertaining to goods and services offered by the vendors (1004). The unit (1001) may also receive updated reports from the vendors regarding the amount of credit expended (1005) or purchased (1006) by an investor. The investor typically has an account, preferably electronically accessible to the issuer or a third party designee, that includes information of the type described herein.

A typical system may process inbound reports and information, calculate a credit balance (1007) available to the investor, and generate outbound reports (1008) to the investor detailing account status and a variety of other information. The information may include information about the investor's available credit, currently participating venues, approved goods and services, interest and principal amounts still owed to the investor, etc.

In certain embodiments, methods are contemplated for providing credit to an investor in a financial instrument, comprising obtaining a principal amount from the investor in exchange for a security (e.g., a bond comprising an obligation to pay a cash interest payment to the investor) and for a right granted to the investor to purchase credit at a price that is a percentage of a currency denominated market value of the credit. In certain embodiments, the methods may be used by providing a computer processor that is linked by a network to one or more computer systems of one or more approved vendors, wherein the processor includes an account for the investor, and downloading desired information into the computer processor regarding the investment vehicle, the investor, and/or third parties (e.g., vendors, servicing agents). In certain embodiments the methods involve downloading into the computer processor information identifying an amount of credit purchased by the investor; electronically providing the information to the one or more computer systems of the one or more approved vendors; electronically receiving one or more reports from the one or more approved vendors with an amount of credit used by the investor; and electronically calculating an amount of credit available in the investor's account.

In certain embodiments the credit is purchased by the investor prior to using the credit for purchases, while in other embodiments the purchase occurs after using the card. In certain embodiments, the cash and credit are not exchanged during the same transaction. Such a purchase of credit may be reflected in the investor's account, and a vendor may deduct a purchase price from this reflected amount. In certain embodiments, the investor's account reflects the amount of money paid by the investor for the credit plus an additional amount provided by the issuer to increase the account balance to reflect a discount. For example, an investor with a credit ratio of 10% will be able to pay $100 and obtain $110 credit, which $110 will be reflected as the available balance in the investor's account.

In certain embodiments, the investor may purchase a good or service from a vendor by use of a credit card from the issuer. The vendor may electronically transfer the amount of the purchase to the investor's account so that it registers therein, through a computer system, and the issuer (or third party designee) can access the account and bill the investor for the purchase.

In certain embodiments the investor may operate its credit account through the use of a purchase card (issued by the issuer or a third party) associated with a purchase card account. For example, the investor may have a purchase card that is linked electronically to the investor's credit account as described herein. The purchase card may allow the investor to use some or all of the investor's available credit (e.g., credit purchased as described herein) to pay for charges accrued to the purchase card account. In certain embodiments, the third party (or issuer) provides a periodic report to the investor with one or more of the following: charges made using the purchase card (e.g., charges for the purchase of goods or services) during the period, available credit in the investor's credit account (e.g., as previously purchased, as described herein), charges for goods and/or services that are eligible to be paid by use of some or all of such available credit (e.g., goods and/or services purchased from authorized venues), an invitation to the investor to indicate how much, if any, of the available credit the investor wishes to apply toward the payment of the charges. The report may also identify the amount of vested credit that has not been purchased by the investor, an invitation to purchase vested credit, and/or an invitation to apply newly purchased credit to satisfy a debt accrued in purchasing qualifying goods and services at authorized venues. The foregoing is not limiting, and any other information may be included in the report.

In certain embodiments, an investor's credit account may be linked electronically to a brokerage account. For example, the investor may use the account card to direct a broker to sell third party securities held by the investor and use some or all of the proceeds to purchase credit for investor's credit account.

The figures describe exemplary embodiments of the invention but are not limiting. One of ordinary skill in the art will understand that the financial instruments and methods described herein can be adapted and modified for other applications, including for use with different kinds of securities, funds, investment vehicles and other equities, assets and negotiable instruments. Such additions and modifications will not depart from the scope hereof. Accordingly, the description and examples set forth herein are for illustration purposes only, and are not to be understood as limiting in any way.

All references are hereby incorporated in their entirety by reference.

The invention claimed is:

1. A computer-implemented method of providing credit for goods and services to an investor, comprising:
   issuing a first security to an investor that requires an issuer to make at least one payment to the investor;
   granting to the investor as part of the first security credit for goods and services available from one or more approved vendors;
   transferring a first principal amount from the investor to the issuer for the first security;
   transferring a portion of the first principal from the issuer to the one or more approved vendors to purchase from the one or more approved vendors a second security, wherein the second security includes a property interest of the one or more approved vendors;
   transferring to the issuer the second security;
   providing a computer processor that is linked by a network to one or more computer systems of the one or more approved vendors and that includes an account for the investor;
   downloading into the computer processor information identifying an amount of credit granted to the investor;
   electronically providing the information to the one or more computer systems of the one or more approved vendors;
   electronically receiving one or more reports from the one or more approved vendors with an amount of credit used by the investor; and electronically calculating an amount of credit available in the investor's account.

2. The computer implemented method of claim 1, further comprising reporting to the investor an amount of credit available to the investor.

3. The computer implemented method of claim 1, further comprising issuing an account card to the investor, the account card being adopted to be read electronically.

4. The computer implemented method of claim 1, wherein the second security comprises a mortgage against a hotel property of the one or more approved vendors.

5. The computer implemented method of claim 4, wherein the credit includes credit for a hotel stay at the hotel property of the one or more approved vendors.

6. The computer implemented method of claim 4, further comprising electronically calculating a reduction in a mortgage payment due from the one or more approved vendors as a function of a credit redeemed for a hotel stay at the hotel property of the one or more approved vendors.

7. The computer implemented method of claim 1, further comprising having the approved vendor accept the credit from the investor and electronically calculating a reduction in the principal as a function of the accepted credit.

8. The computer implemented method of claim 1, further comprising granting to the investor a right to purchase additional credit for goods and services available from the one or more approved vendors in exchange for canceling the obligation to pay at least a part of the principal.

* * * * *